US005394696A

United States Patent [19]

Eich et al.

[11] Patent Number: 5,394,696

[45] **Date of Patent: * Mar. 7, 1995**

[54] HYDRAULIC SYSTEM

[75] Inventors: Otwin Eich; Franz-Peter Salz, both of Remscheid, Germany

[73] Assignee: Barmag AG, Remscheid, Germany

[*] Notice: The portion of the term of this patent subsequent to Mar. 29, 2011 has been disclaimed.

[21] Appl. No.: 920,375

[22] PCT Filed: Dec. 14, 1991

[86] PCT No.: PCT/DE91/00976

§ 371 Date: Oct. 15, 1992

§ 102(e) Date: Oct. 15, 1992

[87] PCT Pub. No.: WO92/10685

PCT Pub. Date: Jun. 25, 1992

[30] Foreign Application Priority Data

Dec. 15, 1990 [DE] Germany ........................ 40 40 177.4
Jul. 26, 1991 [DE] Germany ........................ 41 24 792.2

[51] Int. Cl.[6] ........................ F16D 31/02; F15B 11/00

[52] U.S. Cl. ........................ 60/420; 60/459; 91/511; 91/459

[58] Field of Search ................. 60/420, 422, 426, 445, 60/451, 452, 459, 468, 487, 430; 91/511, 512, 514, 517, 518, 459, 461

[56] References Cited

U.S. PATENT DOCUMENTS

| | | | |
|---|---|---|---|
| 3,987,622 | 10/1976 | Johnson . | |
| 4,103,489 | 8/1978 | Fletcher et al. . | |
| 4,165,613 | 8/1979 | Bernhoft et al. | 60/420 |
| 4,507,057 | 3/1985 | Igarashi et al. | 60/452 X |
| 4,537,364 | 8/1985 | Pollman et al. . | |
| 4,554,992 | 11/1985 | Kassai . | |
| 4,617,854 | 10/1986 | Kropp | 91/517 |
| 4,712,376 | 12/1987 | Hadank et al. | 60/427 |
| 4,723,478 | 2/1988 | Diel et al. . | |
| 4,738,102 | 4/1988 | Kropp | 60/452 X |
| 4,759,183 | 7/1988 | Kreth et al. | 91/459 X |
| 4,845,950 | 7/1989 | Metzner . | |
| 4,856,278 | 8/1989 | Widmann et al. | 60/452 X |
| 4,870,819 | 10/1989 | Walzer | 60/422 |
| 4,922,787 | 5/1990 | Fujisaki et al. | 60/487 X |
| 4,936,095 | 6/1990 | Ross et al. | 60/487 X |
| 4,967,557 | 11/1990 | Izumi et al. . | |
| 5,048,293 | 9/1991 | Aoyagi | 60/420 |
| 5,056,312 | 10/1991 | Hirata et al. . | |
| 5,167,121 | 12/1992 | Sepehri et al. . | |

FOREIGN PATENT DOCUMENTS

| | | |
|---|---|---|
| 0191275 | 8/1986 | European Pat. Off. . |
| 0366815 | 5/1990 | European Pat. Off. . |
| 0440802 | 8/1991 | European Pat. Off. . |
| 2650635 | 2/1991 | France . |
| 2651325 | 8/1977 | Germany . |
| 3546336 | 7/1987 | Germany . |
| WO90/02882 | 3/1990 | WIPO . |

*Primary Examiner*—Edward K. Look
*Assistant Examiner*—Hoang Nguyen
*Attorney, Agent, or Firm*—Bell, Seltzer, Park & Gibson

[57] ABSTRACT

In a hydraulic system, several consumers (4) are supplied by a common pump. In so doing, the consumers (4) are controlled by control valves (6). When the required oil flows exceed the quantity which can maximally be delivered, a control becomes operative which allows to adapt the reference value signals by which the valves (6) are controlled, to the actually measured pump flow, preferably to the weighting of the actually measured pump flow with the maximally predetermined pump flow.

8 Claims, 4 Drawing Sheets

HYDRAULIC SYSTEM

BACKGROUND OF THE INVENTION

The present invention relates to a hydraulic system for feeding hydraulic fluid to a plurality of loads from a common pump.

U.S. Pat. No. 3,987,622 discloses a hydraulic system of the described type wherein the pressure extant at the pump as well as the highest load pressure are applied to a control valve. When the pump cannot furnish the volume flow required by the control valves and their associated consumers, the pressure difference between the pressure of the pump and the highest load pressure is reduced. As a result, the control valve reduces its supply to control pressure transducers by means of which the valves associated with the consumers are actuated. As a result, the flow through the valves is restricted. This restriction, however, becomes effective only when an excess demand already exists. When this restriction becomes effective, the consumers can no longer be controlled by means of their control valves.

In the system known from U.S. Pat. No. 4,856,278, the electrical control signals of the actuated multiple-way valves are added. The volume flow which corresponds to the sum of the control signals is compared with the highest possible pump flow. When the sum of the control signals exceeds the possible pump flow, the control signals are reduced. In this system, it is necessary to evaluate all the control signals. Furthermore, it is necessary by means of a computer to take into consideration the dependence of the valve flows on the control signals.

It is the object of the invention to configure the hydraulic systems so that it is not subject to fluctuations, and that, moreover, it becomes possible to effect a desired weighting or apportioning and adjustment of the individual consumer flows relative to the operating parameters of the pump.

SUMMARY OF THE INVENTION

The above object is achieved with the present invention, which provides the advantage that in contrast to existing hydraulic systems, the operational condition of the pump is determined directly. Therefore, it is possible effectively to control fluctuations of the operational condition.

When the sum of the consumer flows, as determined by the setting of the valves associated with the consumers, rises above the highest quantity which the pump can deliver, the actuating or control signals of the valves will be reduced. By measuring the pump flow it can always be determined, whether the supply of the individual consumers is ensured. An undersupply is thereby avoided. The reduction of the consumer flows may occur proportionately. However, a reduction by priorities is also possible, for example, when a particular consumer should not reduce its speed relative to other consumers.

However, this entails adjustment of the control circuit which is the subject matter of this invention in exceptional cases only, and then only when the deliverable pump flow is insufficient to satisfy the consumer flows set by the respective valves, the total consumer flows constituting the actually delivered quantity. In this event, the actually delivered quantity will be lowered by reducing the respectively supplied consumer flows.

To measure the quantity actually delivered by the pump, standard measuring instruments are available. In particular, it is possible to measure the actually delivered quantity by mounting a throttle or diaphragm into the main output line of the pump (overall supply line), ahead of any consumer lines branch off leading to the valves associated with individual consumers, and to measure any pressure drop at such diaphragm. The actually delivered quantity, related to the predetermined possible delivery at a predetermined speed, however, can also be determined by the other embodiments as disclosed herein.

The adjustment of the consumer flows relative to the predetermined deliverable pump flow is accomplished by adjusting the valves associated with the consumers. In principal, it may be assumed that these valves are adjusted from the outside, that is by hand or electromagnetically or hydraulically by external input parameters. In accordance with this invention, however, these input signals are superimposed by a control signal to reduce the displacement of the valve piston, when it is found by measuring the actually delivered quantity in the hydraulic system that the deliverable pump flow is exceeded.

The predetermined deliverable pump flow does not necessarily correspond to the maximum flow the pump is capable of delivering. Rather, a lesser limit value is set, for instance, at 80% of the maximum deliverable pump flow. In this manner operation of the hydraulic system in its control range is assured in case of an absolute overload of the pump.

Adjustment of the consumer flows to the prevailing deliverable pump flow in case a limit value is exceeded, always takes place by reducing the total of the consumer flows to the level of the predetermined limit value. In the simplest case, this can be done by reducing all consumer flows by the same percentage. However, it is also possible to weight or apportion the control signals by which the consumer flows are reduced, differently for each consumer. In this manner, priority may be accorded individual consumers over other consumers. For example, consumers which for safety reasons need always to receive a certain consumer flow, for example, hydraulic brakes, may be given preference over other consumers, as will be described in more detail at a later point.

One embodiment of the invention as disclosed herein, proceeds upon the realization that the delivered quantity is also determined by the displacement of the piston of a three-way pressure balance, which is displaced as a result of the pressure difference between the pump pressure and the highest load pressure. According to this solution, the actually delivered quantity is measured by measuring the piston displacement of a three-way pressure balance which serves as a superimposed control circuit to keep the pressure difference constant between the pump pressure and the highest consumer pressure.

Another embodiment of the present invention relates to a hydraulic circuit with a regulating pump. With the use of such a regulating pump, the instantaneous delivery volume is adjusted by a relative displacement between the stator (stationary part of the pump) and the rotor (rotating part of the pump) (note, for example U.S. Pat. No. 3,987,622), preferably as a function of the pressure difference between the higher consumer pressure and the pump pressure. In this instance, the normal setting of the regulating pump is used to measure the actually delivered flow.

In one embodiment, a constant pump is used as a delivery pump, which delivers a constant flow per unit of time. In this instance, the delivered quantity is measured directly. This may occur, for example, by means of an installed throttle, at which a pressure difference is detected. However, this may also be done by a three-way pressure difference balance, in which the pressure difference between the pump pressure and the highest load pressure is set at the balance piston, with the portion of the delivered flow not needed to maintain this pressure difference being discharged as a function of the position of the balance piston by way of a bypass into a tank or sump. In so doing, it is possible to use either the position of the piston of the pressure balance or the oil flow in the bypass to the tank as a measure of the delivered flow made available to all consumers. This signal representing the delivered flow is thereafter compared in a comparator stage with a maximum delivery flow and the difference signal is used to adjust or limit the flow supplied to the individual consumers. As stated before, this signal may be superimposed either with the delivery output or the torque and/or with the delivery pressure of the pump.

The special importance of the invention as described above consists in that the pump flow is regulated by adjusting the consumer flows to a predetermined limit value (deliverable pump flow), and in that this regulating will operate only when the predetermined limit value has been reached. Contrary to the normal function of the so-called regulating pump or pressure difference balance, respectively, which actually is a control function of a first control circuit, the regulating pump or pressure difference balance, is included as a measuring element in a second control circuit. Thus, several control circuits are superimposed on each other. An inner control circuit uses the pressure difference delta p between the pump pressure and the highest load pressure as a control value and the control position of the regulating pump or the pressure balance piston as an adjustment value. In this process, the pressure difference delta p is measured at a piston and is predetermined by the dimensioning of the spring of the pressure difference balance. The position of the piston determines the control position, i.e. the adjustment value of the regulating pump or pressure difference balance, respectively.

The superimposed outer control circuit uses the actually measured delivery, the position of the piston of the pressure difference balance, or, the control position of the regulating pump, so as, in an emergency, i.e., when the limit value representing the deliverable pump flow is exceeded, to keep the controlled variable constant, which is predetermined by the limit value, i.e. the actually delivered quantity, by adapting the consumer flows as adjustment value. Additionally, it is possible also to adjust the consumer flows of the individual consumers to the predetermined, maximum deliverable pump flow by superimposing the measured signal obtained by measuring the actually delivered quantity (displacement of the balance piston or, control position of the regulation pump, with the pump delivery according to the pump torque (delivery volume x delivery pressure) and/or the delivery pressure. This has the advantage that a desired weighting or apportioning of the delivery quantity, the delivery torque, and the delivery pressure of the regulating pump can be preset when adjusting the valve position to the maximum pump flow. In this manner, the feed capacity or torque of the pump determined by multiplication of the instantaneous control position of the pump and the feed pressure of the pump is compared with a desired torque, and the output signal obtained from the difference is superimposed according to a selectable function, in such a manner that the position and adjustability of the valves associated with the individual consumers are adjusted only when a predetermined drive moment is exceeded, but not at lower limits. Likewise, it is possible to adjust the position and adjustability of the valves associated with the individual consumers by superimposing the delivery pressure according to a certain function, when a certain pressure is exceeded, but not at lower pressures, or by a certain percentage only. This also takes into consideration the maximum external load when the valves, in particular multipleway valves, associated with the consumers are adjusted.

The adjustment of the pump flow supplied to each consumer and to the consumers as a whole is effected, for example, electrically or hydraulically by adjusting the valves associated with the individual consumers as a function of the control position, or superimposed on the torque and/or feed pressure of the regulating pump. As an alternative, however, a pressure balance may precede each valve, whose pressure difference which is predetermined by a spring, between the delivery pressure and the consumer pressure taken at the output of the respective valve, is adapted by adjusting the spring force as a function of the control position, or superimposed to the torque and/or superimposed to the delivery pressure of the regulating pump.

For special applications of the hydraulic system, it may be useful to process the desired values in a special manner. The desired values are the actuating values manually or automatically set for the valves associated with the consumers. These externally fed desired values may be input into the system by way of dampening members or throttles (ramps). This may yield speed changes with which the consumer flows may change in case of abrupt changes of the input desired values. In this fashion it is possible that the speed with which the pump or the pressure difference balance is changed is in all cases sufficient in order to track the change in time of the consumer volumes. In this fashion, even a short-term undersupply of the consumers is prevented. Furthermore, a course adjustment is possible of the consumer flows determined by the set input values relative to the highest deliverable volume of the pump. For this purpose, the externally set desired values are made to depend on the sum of the set values and, additionally, on the preset deliverable pump flow and/or the minimum pressure difference. This, on the one hand, yields an apportioning of the individual consumers and assures that there is always an adequate oil flow to the most important consumers, for instance for reasons of safety. On the other hand, a reduction of the desired values takes place in advance, when on the basis of input desired value signals it may be expected that the preset deliverable pump flow will be exceeded.

BRIEF DESCRIPTION OF THE DRAWINGS

In the following embodiments of the invention will be explained with reference to the circuit diagrams described below.

In the drawing.

DETAILED DESCRIPTION OF THE PREFERRED EMBODIMENTS

Figure 1:
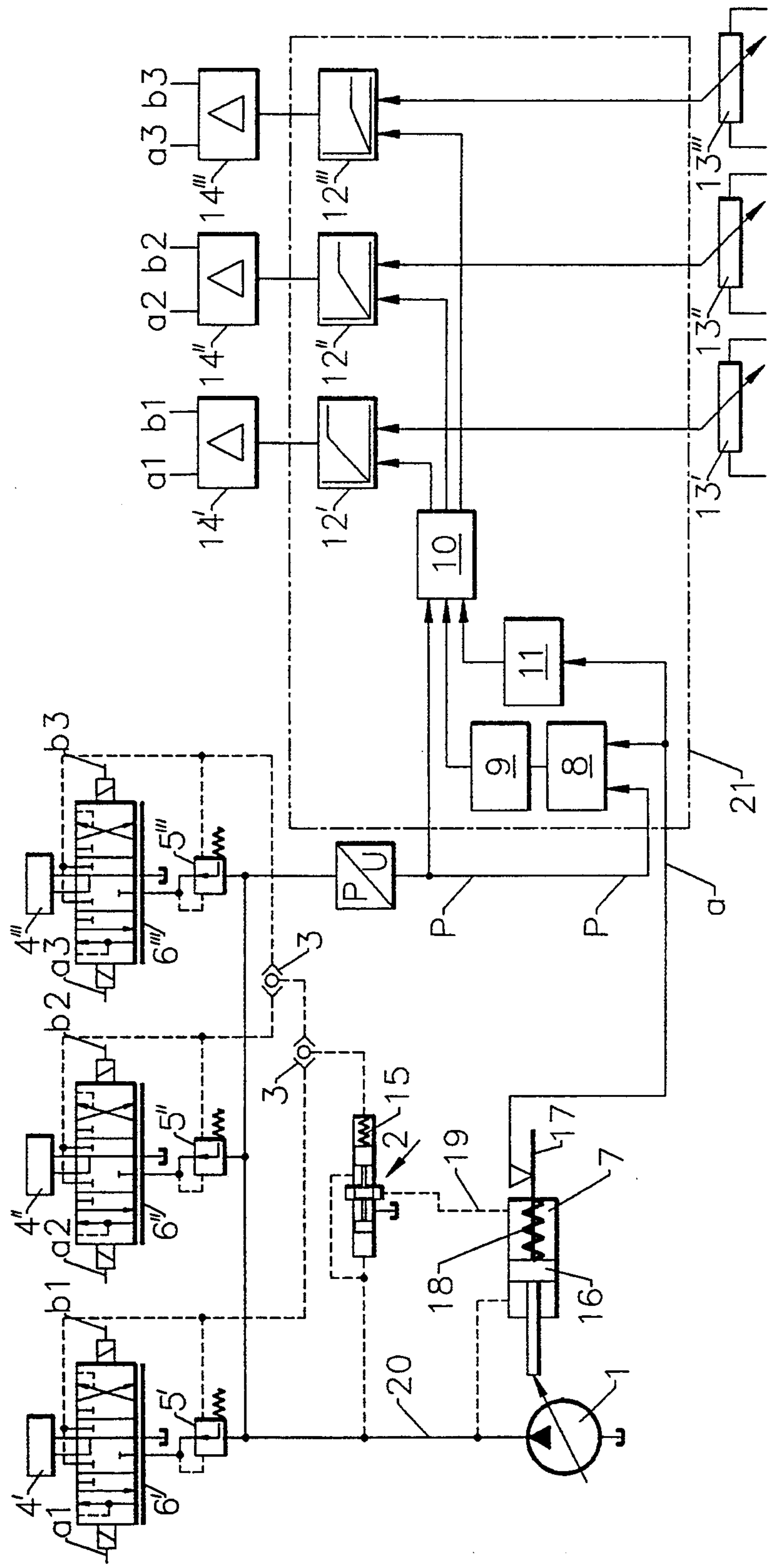
FIG. 1 is a circuit diagram for a hydraulic system with a regulating pump.

In FIG. 1, a regulating pump 1 is hydraulically adjusted. For the hydraulic adjustment, a regulating valve (spring-biased pressure balance) 2 is used which determines the pump flow. To determine the pump flow, the pressure balance 2 receives the pump pressure on the one hand and the highest consumer pressure on the other, together with a spring load by spring 15, via a cascade of changeover valves 3. By means of pump 1 several consumers 4′, 4″, 4‴ are supplied. Each consumer 4 is first preceded by a pressure regulating valve (pressure balance, pressure difference balance) 5′; 5″; 5‴. Each of the pressure regulating valves 5 receives on the one hand the pressure before the associated control valve 6′; 6″; 6‴ (multiway valve) and on the other hand the consumer pressure of the respective consumer 4. This allows for a constant pressure difference on the individual control valve 6, so that in wide ranges it is possible to adjust the volume flow (consumer flow) which is supplied to the respective consumer 4′; 4″; 4‴, in a manner independent of load and proportional to the control.

Thus, in wide ranges, the consumer flow is dependent only on the signals a and b respectively, by which the individual control valves are controlled. As long as these signals remain constant, the consumer flow will remain likewise constantly adjusted. However, this applies only on the condition that the regulating pump is able to make available an adequate pump flow to all consumers.

The regulating pump 1, whose basic design has been described already before, is adjusted by an correcting element 7. This correcting element 7 is a cylinder in which a piston with a piston rod 17 is arranged for sliding movement. The piston adjusts the position of the rotor inside the regulating pump, which is here only indicated. The piston 16 is biased on one side by a spring 18 and by the control pressure in line 19, which is delivered by the pressure balance 2. As explained already before, this control pressure is dependent on the pressure difference between the pump pressure in pump line 20 and the highest consumer pressure which is determined by a cascade of changeover valves 3. On its side facing away from spring 18, the piston 16 is biased by the pump pressure in pump line 20. The spring 18 and the control pressure 19 are operative in the meaning of increasing the delivery volume of the regulating pump.

Thus, the regulating pump is included in a control circuit and has the function of supplying the correcting variable to keep the controlled variable constant: pressure difference between the highest consumer pressure and the pump pressure.

The path of displacement, by which the regulating pump 1 is adjusted by means of correcting element 7, is measured. This path of displacement alpha is measured and supplied to a controller 21 which will be described further below. Further the controller receives a signal which presents the measured pump pressure and is hereafter referred to P. As a matter of course, it will be necessary to convert both the adjustment value alpha and the pressure P via suitable converters into a form suitable for the controller, for example, a voltage.

It should be mentioned that the controller 21 is provided on the one hand with reference value inputs 13′, 13″, 13‴ and on the other hand with reference value outputs, in particular amplifiers 14′, 14″, 14‴. Each output is connected with its output lines A and B to the consumer which has the same numbering. For the purpose of maintaining the clarity of the circuit diagram, these connecting lines are not shown.

As aforesaid, the controller 21 further possesses the inputs for the path of displacement alpha and the pressure P. The controller serves to adapt the input reference values to the measured pump flow.

Figure 2:
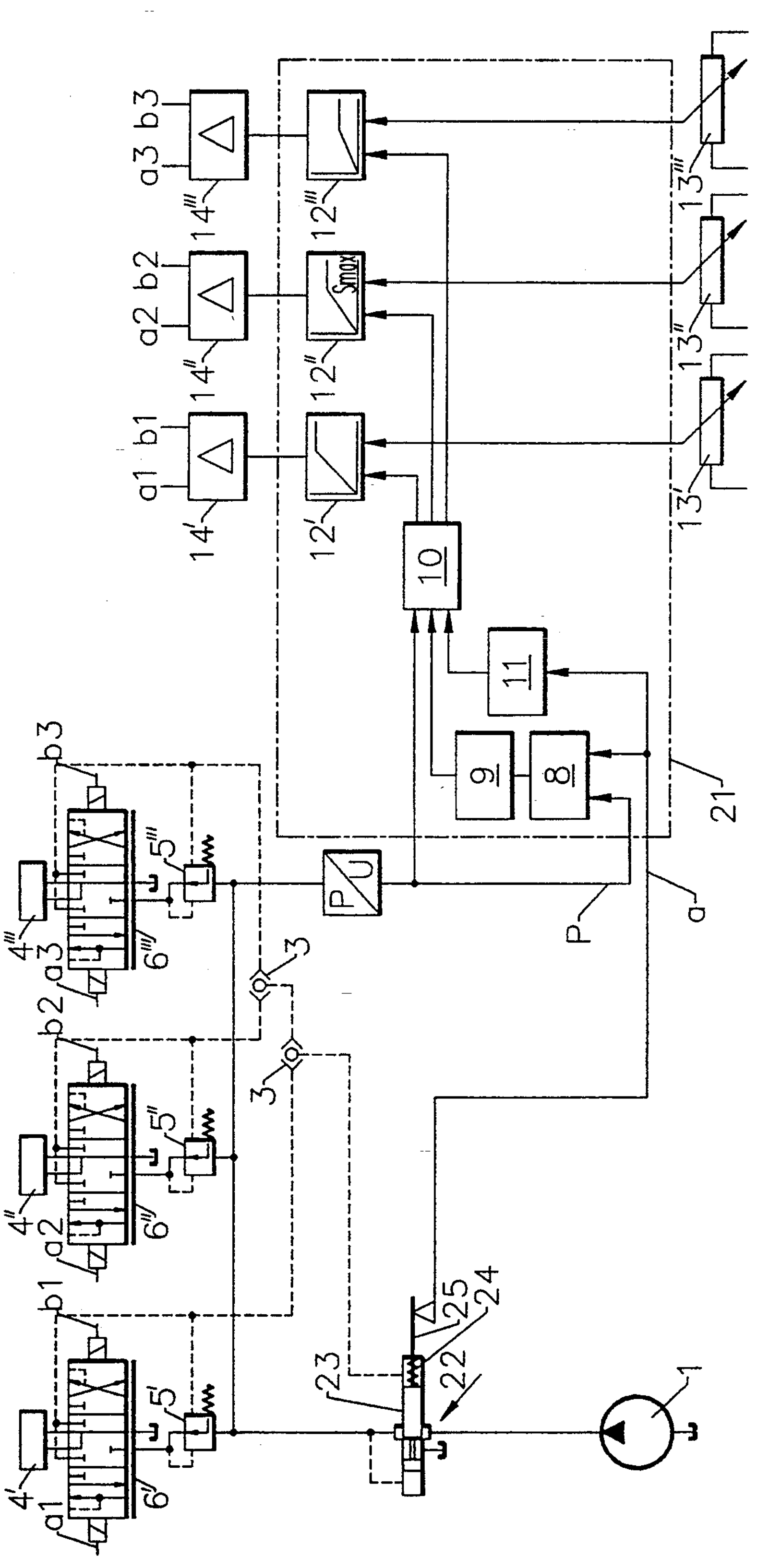
FIG. 2 is a circuit diagram to illustrate the hydraulic system, in which a pressure difference balance is used to measure the quantity of delivery.

The same controller is also used for the hydraulic system shown in FIG. 2, which will therefore be described first.

In FIG. 2, three consumers 4′, 4″, 4‴ are supplied by a constant hydraulic pump 1. In this process, the volume flow is controlled by means of a pressure difference balance 22. A piston 23 of the pressure difference balance is biased on its one side by a spring 24 as well as the highest load pressure. The highest load pressure is determined via a cascade of changeover valves 3. On its other side, the piston 23 is biased by the pump pressure. The pressure difference balance is connected with a tank via a bypass line. An adjustment of piston 23 allows to adjust a constant pressure difference. This adjustment remains effective until the sum of the consumer flows supplied to the consumers exceeds the maximally deliverable pump flow.

Each consumer 4 is preceded by a pressure regulating valve (pressure balance, pressure difference balance) 5′; 5″; 5‴. Each pressure regulating valve 5 receives on the one hand the pressure before the associated control valve 6′, 6″, 6‴ (multiway valve) and on the other hand the consumer pressure of the respective consumer 4. As a result, a constant pressure difference is adjusted on each control valve 6, so that over wide ranges it is possible to adjust in a manner independent of load and proportional to the control, the volume flow (consumer flow) which is supplied to the respective consumer 4′; 4″; 4‴.

The balance piston of the pressure difference balance possesses a piston rod 25. The path of displacement of piston 23 is measured. Its output signal is referred to as alpha. The pump pressure and the path of displacement alpha of the piston are supplied to the controller 21 which has been described above and is herewith referred to.

Figure 3:
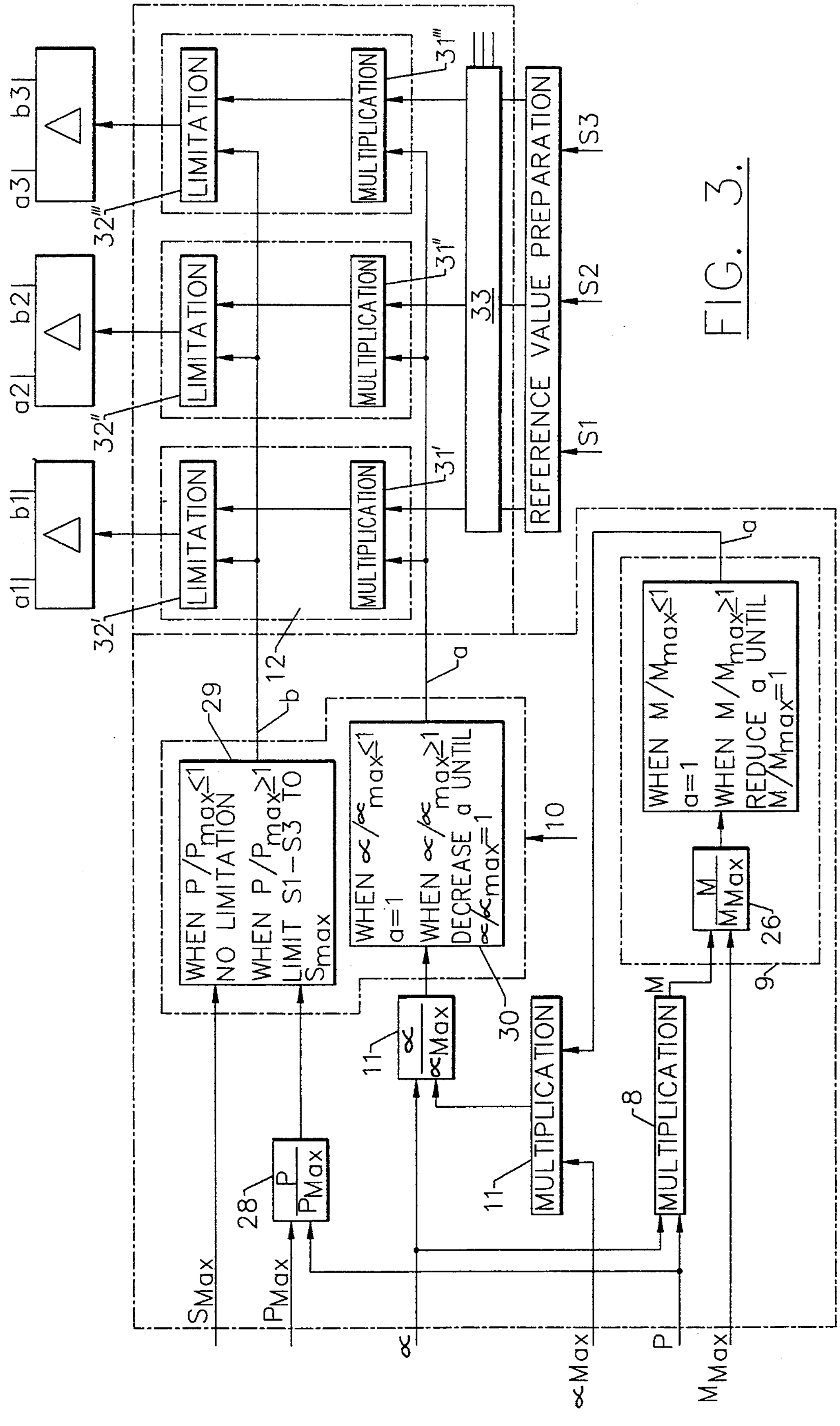
FIG. 3 is a circuit diagram with details of FIGS. 1 and 2 respectively.

With reference to FIG. 3 and also referring to the thus far identical FIGS. 1 and 2, the following will describe the processing of the reference values which are input in controller 21, to correcting variables for the multiway valves 6.

In controller 21, the path of displacement alpha is input into a component 11. Simultaneously, a limit value alpha max is input in component 11. This limit value alpha max may be input constant, when only the input of the displacement path is connected to controller 21. When the pump pressure P is also connected, a further processing will occur, which will be described in more detail further below.

In component 11, the measured path of displacement and the limit value alpha max are weighted. The output signal of component 11 is supplied to a further component 10. This functional component 10 results in a positive, constant output signal equal to 1, as long as the limit value alpha max of the path of displacement is greater than the measured path of displacement. When the path of displacement alpha exceeds the limit value, the output signal of functional component 10 becomes smaller than 1. Proceeding from 1, the output signal a of functional component 10 or 30 becomes smaller, as long as the path of displacement alpha exceeds the limit value, and until an equilibrium sets in between the two. The output signal of the functional component 10, hereafter weighting component, can be influenced further by connecting the pressure measuring line P to controller 21. To this end, the measured value of the path of displacement is input, together with the pump pressure, in a multiplier 8. The output signal of multiplier 8 represents the hydraulic torque of pump 1. In component 9, this output signal is related to the maximally possible output signal. The output signal of component 9 is input in a further component 10, which performs a weighting. The weighting may occur with the pump pressure and/or the actual path of adjustment of the regulating pump. To this end, also the actual path of displacement is again related, via component 11, to the maximum path of displacement.

In this process, as is shown in FIG. 3, the output signal of multiplier 8 is supplied via a comparison component 26 to the functional component 9. In the comparison component, the actual torque of the pump as determined by multiplication, is related to the limit value Mmax of the pump, which is input constant. Functional component 9 now processes the output signal of comparison component 26 such that it delivers an output signal equal to 1, when the actual torque is smaller than the limit value of the torque, and that it supplies an output signal which becomes smaller with the time, as long as the actually determined torque is greater than the limit value. The output signal becomes smaller in accordance with a time-dependent function proceeding from 1, until the reduction of the torque results in an equilibrium. The output signal of the functional component 9 is now used to prepare the maximum path of displacement alpha max, as has already been indicated before. To this end, a multiplication component 27 is used. This multiplication component receives in fixed form on the one hand from outside the limit value of the path of displacement alpha max, and on the other hand the output signal of functional component 9, which is put in relation to the actual torque. The output signal of multiplication component 27 is again supplied to comparator 11. As a result, it is accomplished that when the preset torque is exceeded, the delivery of the pump will be reduced.

To also take account of the pump pressure, in a comparator 28 (comparison component), a limit value of the pump pressure which is input fixed, is correlated to the actually measured pump pressure. Component 10 also contains a functional component 29 which is controlled by the output signal of comparator 28 and additionally by a limit value which represents the maximum reference value. These input variables are now processed in functional component 29 such that the functional component 29 delivers an output signal B which is equal to zero, as long as the measured pump pressure is smaller than the limit value Pmax of the pressure, and which is equal to the limit value Smax of the reference values, when the measured pump pressure exceeds the limit value Pmax of the pump pressure.

The weighting component 10 with its two output signals A of functional component 30 and B of the functional component then controls comparison elements 12', 12'', 12''' which are each associated to one of valves 6', 6'', 6''' for the individual consumers 4', 4'', 4'''. Each of these comparison elements 12 may receive a different reference value via reference input elements 13', 13'', 13'''. The output signals of the comparison elements 12 are then superposed via amplifiers 14', 14'', 14''' to the respective control signals for the magnets a1, b1, a2, b2, a3, b3 of the respective valves 6', 6'', 6''' or to the input signals of the correcting elements, by which the multiway valves 6 are controlled. As a result, it is possible to reduce the volume flow supplied to the individual consumer 4', 4'', 4''' in accordance with a preset function and a preset reference value to such an extent that the total quantity which pump 1 is able to deliver, is not exceeded. The simultaneous determination and direct input of the path of displacement or the angle of traverse of regulating pump 1 allows to ensure at the same time in weighting component 10 that likewise an adaptation of the actual delivery to the maximally possible delivery occurs simultaneously with the adaptation to the actual torque of pump 1. Likewise, it is possible to input in the weighting the actual pump pressure E or other operating parameters of the hydraulic system.

To this end, as shown in FIG. 3, the comparison elements 12 are divided into a multiplication component 31', 31'', 31''' well as into a limitation component 32', 32'', 32'''. The multiplication component receives respectively the output signal A of the functional component 30 as well as the adjusted reference value S1, S2, S3. The adjusted reference value S is thereby correlated to the actual path of displacement of the pressure balance or regulating pump, when the sum of the consumer flows exceeds the limit value of the pump flow. The reference values are correspondingly reduced. The output signal of multiplication component 31 is supplied to limitation component 32 together with the output signal B of functional component 29 which establishes the relation to the measured pump pressure. When the preset limit value of the pump pressure is exceeded, the output signal of the limitation component 32 will be limited to the input limit value Smax of the reference value. In each of components 32', 32'', 32''' a further weighting of the supplied limit value Smax may occur in the meaning that either no limitation occurs or that the limit value is decreased or increased. This allows to give priorities to individual consumers. Other consumers may be shut down or be treated with lower priority, should the preset reference value inputs lead to an exceeding of the limit value of the pump flow.

Figure 4:
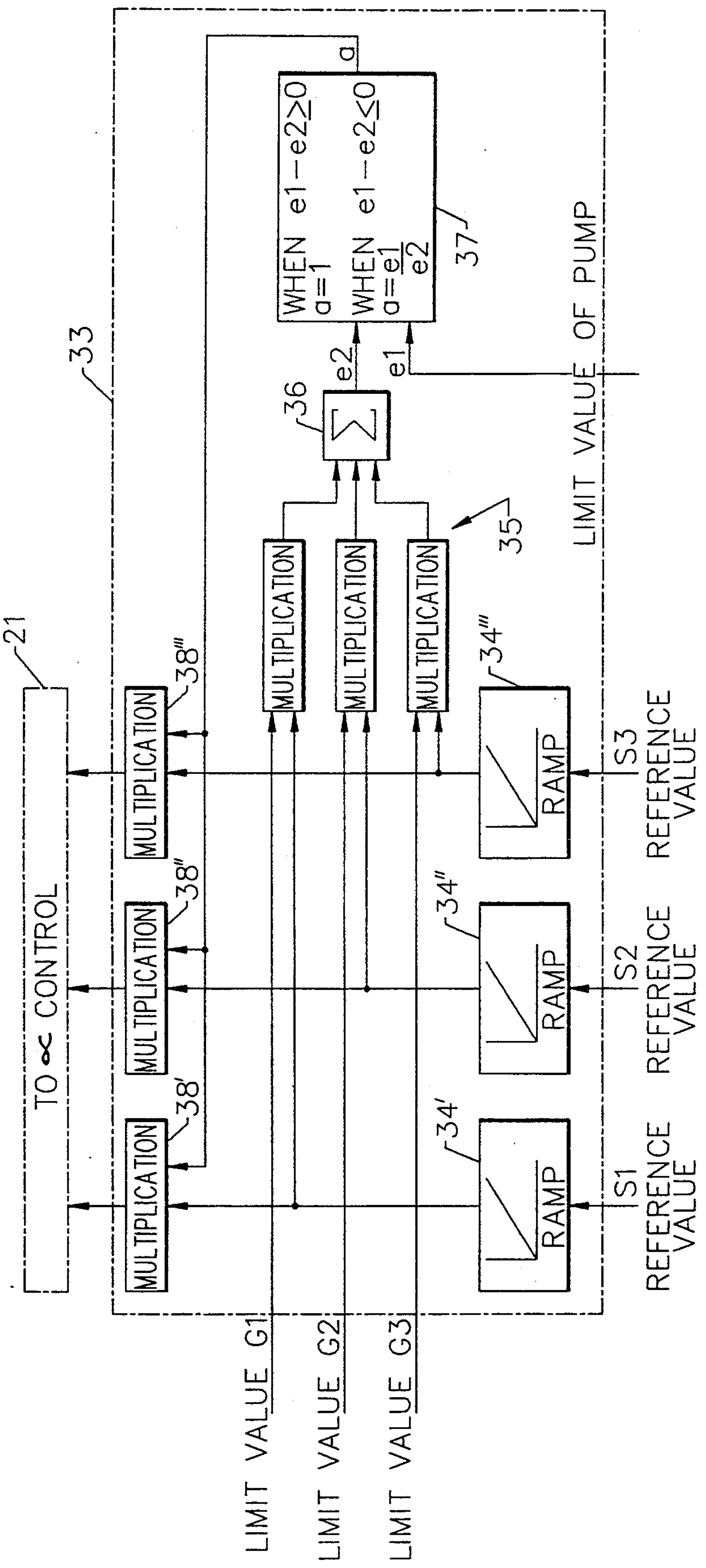
FIG. 4 is a circuit diagram for the reference value preparation.

Additionally shown in FIG. 4 is a reference value preparation which may be used optionally. For this purpose, it is possible to arrange a reference input element 33 before controller 21. The reference input element comprises a first component 34 for each input reference value, which is hereinafter referred to as ramp. This ramp effects that a suddenly input reference value changes only as a function of time. As a result, it is effected that also in the case of a sudden reference value input, the signal processing and the adaptation of the hydraulic system can follow in time, and that the consumers are not temporarily undersupplied. The output signals of ramps 34 are then multiplied in multiplication components 35 with input limit values, labeled Limit Value 1, Limit Value 2, and Limit Value 3 in FIG. 4. These limit values represent a certain percentage of the limit value of the pump flow. As a result, the input reference values are weighted in multiplication components 35. The output signals of the multiplication components 35 are supplied to a summing element 36 with an output signal E2 which represents the sum of the output signals of the multiplaction components.

The signal E2 is supplied together with a signal E1 to functional component 37. The signal E1 represents the maximally preset pump flow in a form which is comparable with the signal E2. In functional component 37, the two input signals E1 and E2 are correlated. The output signal A is equal to 1, as long as the preset limit value of the pump flow is greater than the adjusted and weighted sum of the reference values. The output signal is equal to the quotient of limit value and weighted sum, when the weighted sum is greater than the limit value.

The output signal of functional component 37 is now input in multiplication components 38', 38'', 38'''. In each of the multiplication components 38, the respective reference value S1, S2, S3 is multiplied, after it has preferably first been guided over ramps 34', 34'', 34'''. The output signal of the multiplication components 38 represents the respective reference value which is input in controller 21. This reference value preparation allows to make provisions already when the reference values are input, so that the adjusted reference values do not lead to a consumption which exceeds by far the predetermined limit value of the pump flow. This, however, is only a rough precaution. In accordance with the invention, the superposition of the adaptation of the consumer currents to the measured pump flow ensures that each consumer remains operable within its assigned scope.

The special importance of the invention consists in that while the torque of the pump is regulated on the one hand, it is possible to superpose this torque regulation with an adjustment of the output in that, simultaneously, also the speed of the pump or its delivery quantity is determined.

In a hydraulic system, several consumers 4 are supplied by a common pump. In this process, the consumers 4 are controlled by control valves 6. When the required oil flows exceed the quantity which can maximally be delivered, a regulation starts to become operative which allows to adapt the reference value signals, by which the valves 6 are controlled, preferably to the weighting of the actually measured delivery flow of the pump with the maximally predetermined delivery flow of the pump.

We claim:

1. A hydraulic system for feeding hydraulic fluid to a plurality of loads (4) from a common pump (1) at a rate not exceeding a predetermined capacity of said pump, comprising individual control valve means (6) associated with each of said plurality of loads for controlling the flow to each of said loads, and pressure balance means for directly measuring the actually delivered flow rate of said pump, and upon exceeding a predetermined limit value, controlling said loads by adjusting each of said control valve means in response to the actually delivered flow rate.

2. The hydraulic system as defined in claim 1 wherein said measuring and controlling means comprises a three-way pressure balance (2,22) for measuring the pressure difference between the pump pressure and the highest load pressure, said balance including a displaceable piston and means for biasing one side of said piston with the pump pressure and biasing the other side of said piston with a spring and the highest load pressure.

3. The hydraulic system as defined in claim 1 wherein said pump includes a stator and a rotor which are displaceable relative to each other so as to vary the actually delivered flow rate of said pump, and said measuring and controlling means includes means for detecting the relative position of said stator and rotor.

4. The hydraulic pump as defined in claim 3 wherein said measuring and controlling means includes means for adjusting the relative position of said stator and rotor of said pump so as to control the actually delivered flow rate of said pump.

5. The hydraulic pump as defined in claim 1 wherein said measuring and controlling means further comprises means for determining the product of the actually delivered flow rate and the pump pressure, and for comparing the resulting product with the maximum possible output torque of the pump.

6. The hydraulic system as defined in claim 1 wherein said measuring and controlling means further comprises means for determining the pump pressure, and for comparing the pump pressure with the maximum possible pump pressure.

7. The hydraulic system as defined in claim 1 wherein said measuring and controlling means further comprises means for reducing the flow rate supplied to each load in accordance with a preset function to such an extent that the maximum flow capacity of said pump is not exceeded.

8. The hydraulic system as defined in claim 1 wherein said measuring and controlling means further comprises means for determining a reference valve signal for each of said loads, multiplying each reference value signal by a predetermined limit value for each load, summing the multiplied signals to produce an output signal, and multiplying each predetermined limit value with the output signal and delivering the resulting products to the respective loads.

* * * * *